3,097,216
BLUE ACID ANTHRAQUINONE-DYESTUFFS
Johannes Heyna and Erich Schinzel, Frankfurt am Main, and Walter Noll, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Aug. 1, 1960, Ser. No. 46,369
Claims priority, application Germany Aug. 8, 1959
4 Claims. (Cl. 260—372)

The present invention relates to new blue acid dyestuffs of the anthraquinone series, in particular it relates to dyestuffs which correspond to the following general formula

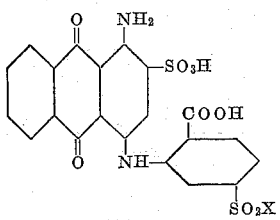

in which X represents the group $-CH_2-CH_2-OSO_3H$ or the radical

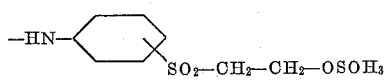

We have found that valuable blue acid anthraquinone-dyestuffs, which are readily soluble in water, are obtained by condensing according to the usual methods an amine corresponding to the general formula

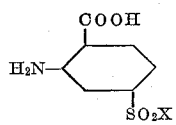

in which X represents the group $-CH_2-CH_2-OH$ or the radical

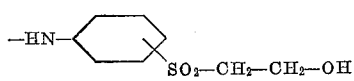

with 1-amino-4-bromoanthraquinone-2-sulfonic acid and converting the condensation product so obtained into its acid sulfuric acid ester.

The amines used as starting materials, for instance the 3 - amino - 4 - carboxyphenyl - 1 - β - hydroxyethylsulfone can be prepared by reacting 3-actamino-4-carboxybenzene sulfinic acid with chloroethanol or ethylene oxide and subsequently splitting off the acetyl group. The sulfone-anilides of 3-amino-4-carboxybenzene sulfonic acid containing β-hydroxyethylsulfone groups can be prepared, for example by reacting 3-acetamino-4-carboxybenzene sulfochloride with aminophenyl-β-hydroxyethylsulfones in an aqueous solution in the presence of alkalies and subsequently splitting off the acetyl group.

The special value of the new dyestuffs lies in the fact that they possess a very good solubility and are, therefore, especially suitable as dyestuffs for dyeing processes. They can be fixed on cellulose fibers in the presence of alkalies and yield dyeings and prints of good to very good wet fastness properties and a very good fastness to light. As compared with dyestuffs of analogous structure obtained from amines containing β-hydroxyethylsulfone groups but no carboxyl groups, the new dyestuffs are distinguished by a considerably better solubility, an excellent stability of the alkaline padding baths and by better wet fastness properties.

The following examples serve to illustrate the invention but they are not intended to limit it thereto, the parts being by weight unless otherwise stated and the relationship of parts by weight to parts by volume being the same as that of the kilogram to the liter.

*Example 1*

47.2 parts of 1-amino-4-bromoanthraquinone-2-sulfonic acid of 81.3% strength are heated to 85° C. with 200 parts of water, 25 parts of anhydrous potassium acetate and 1 part of copper powder. A solution of 24.5 parts of 3-amino-4-carboxyphenyl-β-hydroxyethylsulfone melting at 177° C. to 178° C. in 100 parts of water and 5.6 parts of potassium hydroxide is then added.

0.5 part of copper powder is introduced and the mixture is heated at 85° C. to 87° C., until the condensation is complete. The dyestuff is precipitated by acidification with hydrochloric acid and purified by stirring it with 3 n-hydrochloric acid at 70° C.

For the esterification 57.4 parts of the dyestuff so obtained are introduced into 320 parts of concentrated sulfuric acid and stirred until the product is completely dissolved. This solution is then poured on a mixture of 900 parts of ice and 100 parts of water and the dyestuff is salted out with potassium chloride. It is filtered off with suction, suspended in water and adjusted with sodium carbonate to a pH-value of 6, salted out, filtered off with suction and dried.

The dyestuff so obtained is readily soluble in water and it is suitable as printing dyestuff and especially as dyestuff for dyeing processes. On native or regenerated cellulose fibers there are obtained from salt-containing dye baths in the cold or in the heat by means of alkalies blue dyeings which are distinguished by good to very good wet fastness properties and a very good fastness to light.

*Example 2*

47.2 parts of 1-amino-4-bromoanthraquinone-2-sulfonic acid of 81.3% strength are heated to 85° C. with 200 parts of water, 25 parts of anhydrous potassium acetate and 1 part of copper powder. A solution of 40 parts of 3-amino-4-carboxybenzene-1-sulfonic acid-(3'-β-hydroxyethylsulfonyl)-anilide melting at 203° C. to 204° C. in 100 parts of water and 5.6 parts of potassium hydroxide is then added. Thereupon, 0.5 part of copper powder is introduced and the mixture is heated at 85° C. to 87° C. until the condensation is complete. The dyestuff is precipitated by acidification with hydrochloric acid and purified with hot dilute hydrochloric acid.

The esterification of the dyestuff is carried out as described in Example 1. The dyestuff so obtained is readily soluble in water and especially suitable as printing dyestuff. On native and regenerated cellulose fibers there are obtained by means of alkalies blue prints of good to very good wet fastness properties, a good fastness to chlorine and a very good fastness to light.

A dyestuff of similar good fastness properties is obtained by using 3 - amino - 4 - carboxybenzene - 1 - sulfonic acid-(4'-β-hydroxyethylsulfonyl)-anilide instead of 3 - amino - 4 - carboxybenzene - 1 - sulfonic acid - (3'-β-hydroxyethylsulfonyl)-anilide.

We claim:
1. Blue acid anthraquinone-dyestuffs which correspond to the general formula

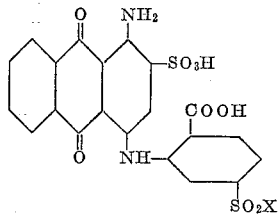

in which X represents a member selected from the group consisting of —CH$_2$—CH$_2$—OSO$_3$H,

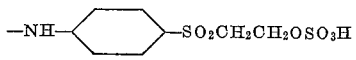

and

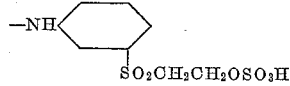

2. The anthraquinone-dyestuff which corresponds to the formula

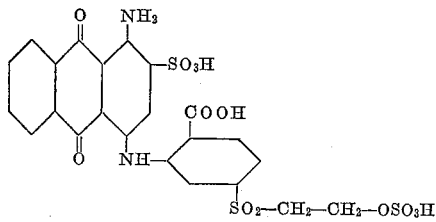

3. The anthraquinone-dyestuff which corresponds to the formula

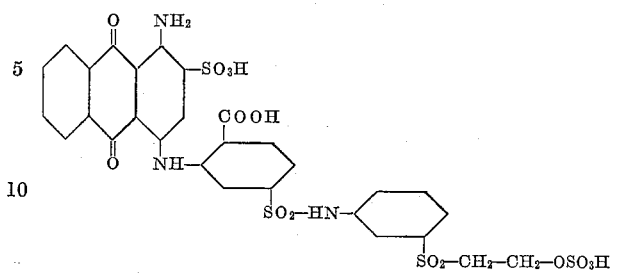

4. The anthraquinone-dyestuff which corresponds to the formula

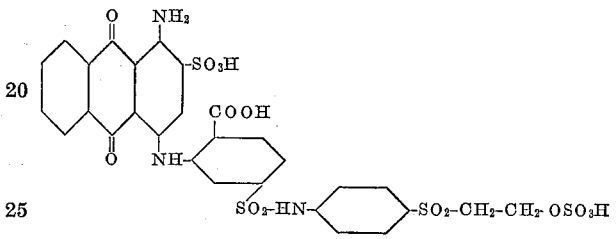

References Cited in the file of this patent
UNITED STATES PATENTS

| | | |
|---|---|---|
| 2,195,067 | Weinand et al. | Mar. 26, 1940 |
| 2,453,104 | Vogt | Nov. 2, 1948 |
| 2,583,520 | Sutter et al. | Jan. 22, 1952 |
| 2,670,265 | Heyna | Feb. 23, 1954 |